(12) United States Patent
Dubrovsky et al.

(10) Patent No.: US 7,469,284 B1
(45) Date of Patent: Dec. 23, 2008

(54) METHODS AND APPARATUS FOR ASSIGNING MANAGEMENT RESPONSIBILITIES TO MULTIPLE AGENTS

(75) Inventors: Alexander Dubrovsky, Westborough, MA (US); James E. Lavallee, Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 738 days.

(21) Appl. No.: 11/024,231

(22) Filed: Dec. 28, 2004

(51) Int. Cl.
*G06F 15/16* (2006.01)

(52) U.S. Cl. .................. 709/223; 709/201; 709/202; 709/203; 709/224; 709/229

(58) Field of Classification Search ......... 709/201–203, 709/223, 224, 229
See application file for complete search history.

(56) References Cited

U.S. PATENT DOCUMENTS

| | | | |
|---|---|---|---|
| 7,263,590 B1 * | 8/2007 | Todd et al. ................. | 711/165 |
| 7,275,048 B2 * | 9/2007 | Bigus et al. ................. | 706/46 |
| 2003/0084009 A1 * | 5/2003 | Bigus et al. ................. | 706/6 |
| 2003/0084010 A1 * | 5/2003 | Bigus et al. ................. | 706/6 |

* cited by examiner

*Primary Examiner*—Liangche A Wang
(74) *Attorney, Agent, or Firm*—Chapin IP Law, LLC; Barry W. Chapin, Esq.

(57) ABSTRACT

A management control center identifies multiple remotely located agents and their corresponding abilities to manage devices in a storage area network on behalf of the management control center. In response to learning capabilities of the multiple agents, the management control center assigns a first agent of multiple agents in the storage area network to handle execution of a first set of management functions associated with a given device in the storage area network. Additionally, the management control center assigns a second agent of multiple agents in the storage area network to handle execution of a second set of management functions associated with the given device. This technique of assigning multiple agents (rather than a single agent) different management functions alleviates a management control center from having to coordinate direct communications with and control many different types of vendor devices in the storage area network.

29 Claims, 7 Drawing Sheets

METHODS AND APPARATUS FOR ASSIGNING MANAGEMENT RESPONSIBILITIES TO MULTIPLE AGENTS

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to an increased need for storage by integrating high capacity data storage systems, data communications devices (e.g., switches), and computer systems (e.g., host computers or servers) into networks called "storage networks" or "Storage Area Networks" (SANs.) In general, a storage area network is a collection of data storage systems that are networked via a switching fabric to a number of host computer systems operating as servers. The host computers access data stored in the data storage systems on behalf of client computers that request data from the data storage systems. For example, according to conventional applications, upon receiving a storage access request, a respective host computer accesses a large repository of storage through the switching fabric on behalf of the requesting client. Thus, a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional network management storage application generates a graphical user interface utilized by a network manager to graphically select, interact with, and manage local or remote devices and associated software processes associated with the storage area network. Based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. Consequently, a network management station and associated management software enables a network administrator or systems manager (a person responsible for managing the storage network) to manage the storage area network and its resources. One purpose of managing storage area network resources is to maintain the storage area network so that it is properly configured to provide efficient data access to many users.

To manage devices such as switch devices in a fabric of the storage area network, a network administrator must have knowledge of operations supported by the devices as well as protocols used to communicate with the devices. A storage area network typically includes many different vendor types of devices that must be managed. Thus, to manage such devices in the storage area network, a network manager must typically communicate directly with the switch devices using many different communication protocols.

SUMMARY

Conventional network management applications that support management of network resources in a storage area network typically suffer from a variety of deficiencies. For example, conventional manager applications potentially face a problem of having to learn management capabilities supported by many different types of vendor's switch devices in order to communicate with and control such switch devices. For example, being able to control switch devices in a storage area network may require that a centralized control system operated by a network administrator is able to support communication with each of different vendor types of devices in the storage area network. After learning of operations supported by the different types of devices (e.g., devices manufactured by different vendors) based on direct inquiries, conventional network manager applications have to maintain respective communication interfaces for the different protocols via different interfaces in order to be able to further communicate with and control the devices in the storage area network.

Techniques discussed in this application provide advantages over conventional network management applications. In particular, embodiments of the present application include mechanisms and techniques for offloading execution of management functions or operational control to multiple agents distributed in a storage area network environment. For example, a management control center identifies multiple agents and their corresponding abilities to manage devices in the storage area network on behalf of the management control center. In one application, the multiple agents reside on respective host entities (e.g., independent of the management control center) that execute management functions associated with the devices. In response to learning capabilities of the multiple agents, the management control center assigns a first agent of multiple agents in the storage area network to handle execution of a first set of management functions associated with the device. Additionally, the management control center assigns a second agent of multiple agents in the storage area network to handle execution of a second set of management functions associated with the device. The second set of management functions is exclusive of the first set of management functions. This technique of assigning different management functions to multiple agents (rather than a single agent) alleviates the management control center from having to coordinate direct communications with many different types of vendor devices in the storage area network in order to control the respective devices.

In one application, the management control center receives information collected by the multiple agents. The information includes an indication of the corresponding abilities of the multiple agents to perform management tasks associated with the device. Based on the corresponding abilities of the agents to perform management tasks, the management control center determines which agent in the storage area network to assign handling of a respective set of management functions.

The management control center notifies the agents of their respectively assigned management functions. For example, the management control center notifies a first agent of an assignment to support a first set of management functions associated with the device. The management control center also notifies a second agent of an assignment to support a second set of management functions associated with the device. Thus, responsibilities of executing management functions (e.g., control) associated with the device on behalf of the management control center are split amongst multiple agents.

The management control center may notify the agents that they are assigned as primary agents (as opposed to being backup agents) to support respective management functions. Providing notification to the agents that they are assigned as respective primary agents for supporting different management functions may prompt the agents to run management programs initiating communication with the device prior to the respective agents receiving user-generated commands from the management control center to perform management functions with respect to the device. In other words, after an agent learns that it is assigned to support certain management functions, an agent may respectively launch a management program to initiate handshaking with (e.g., to query) a target device (e.g., the device being controlled by the agent) so that the agent, when prompted to do so by a management control center, can immediately interrogate the device and prepare to execute management functions and control the device upon request of the management control center.

The management control center may assign different management tasks to the agents in a number of ways. For example, according to one technique, the management control center selects an agent to perform management functions depending on the respective host entities on which the agents reside. In such an application, the management control center identifies that a first agent resides on a respective first host entity in the storage area network as well as identifies that a second agent resides on a respective second host entity in the storage area network. The management control center receives information indicating performance capabilities associated with the respective first host entity and the respective second host entity. Based on a performance capability of the respective first host entity and second host entity on which the agents reside, the management control center assigns unique sets of management functions to the agents to control storage area network devices.

According to another technique, the management control center may assign agents in the storage area network to handle management functions in response to identifying a type associated with the device. For example, the management control center may select particular agents amongst multiple agents to handle execution of the management functions in response to determining which agents are suited to support a particular type of device. It should be noted that agents in the storage area network can be configured to perform management functions associated with a particular vendor type.

According to yet another technique herein, the management control center may determine which agents to assign different management functions depending on types of interfaces associated with the agents. For example, agents may include one or multiple interfaces supporting respective one or multiple communication protocols to communicate and control a target device in the storage area network. The management control center receives information from the agents about types of interfaces associated with each of the multiple agents. The information may include an indication of corresponding protocols such as i) SNMP (Simple Network Management Protocol), ii) FAL (Fabric Access Layer), iii) SMI (Storage Management Interface), and iv) FC_SWAPI (Fibre Channel SWitch Application Programming Interface), etc. supported by the agent interfaces.

According to still another technique herein, the management control center may assign an agent to be responsible for handling execution of a first set of management functions based on an ability of one agent to communicate with and control a target device compared to abilities of other agents to communicate with and control the target device. The abilities of the agents to communicate with the device may be based at least in part on a respective number of node hops required to communicate between a host entity on which a respective agent resides and the device. In this latter instance, agents located closer (e.g., requiring fewer hops to communicate) to the target devices being controlled are more likely to be assigned to perform the respective management functions.

Techniques of the present application are well suited for use in systems in which a management control center discovers management capabilities of multiple different vendor types of devices in a storage area network and the management control center assigns agents distributed in the storage area network duties of communicating with and controlling the devices. However, it should be noted that embodiments of the present application are not limited to use in such applications.

Other embodiments of the present application include a computerized device (e.g., a host computer, workstation, etc.) configured to support the aforementioned method operations disclosed herein as embodiments of the present application to assign management capabilities among multiple agents in a storage area network. In such embodiments, the computerized device includes a memory system, a processor (e.g., a processing device), a display, and an interconnect. The interconnect supports communications among the display, the processor, and the memory system. The memory system is encoded with an application that, when executed on the processor, produces a process that supports offloading execution of management operations to agents on behalf of a management control center.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to support management capability discovery and device management execution as explained herein. The computer program logic, when executed on at least one processor with a computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the present application.

One more particular embodiment of the present application is directed to a computer program product that includes a computer readable medium having instructions stored thereon for supporting management of network resources. The instructions, when carried out by a processor of a respective computer device, cause the processor to perform the steps of: i) identifying multiple agents and their corresponding abilities to manage a device (e.g., a switch device in a storage area network) on behalf of a management control center that utilizes the multiple agents (e.g., agents that reside on respective at least one host entities independent of the management control center) to execute management functions associated with the device; ii) assigning a first agent of the multiple agents in the storage area network to handle execution of a first set of management functions associated with the device; and iii) assigning a second agent of the multiple agents in the storage area network to handle execution of a second set of management functions associated with the device, the second set of management functions being exclusive of the first set of management functions. Other embodiments of the present application include software programs to perform any of the method embodiment steps and operations summarized above and disclosed in detail below.

It should be understood that the system of the present application can be embodied as a software program or as a software program operating in conjunction with corresponding hardware. Example embodiments of the present application may be implemented in conjunction with EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present application, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

A management control center identifies multiple remotely located SAN agents and their corresponding abilities to manage SAN equipment (e.g., switch devices in a SAN fabric) on behalf of the management control center. In response to learning capabilities of the multiple agents, the management control center assigns a first agent of multiple agents in the storage area network to handle execution of a first set of management functions associated with a given device in the storage area network. Additionally, the management control center assigns a second agent of multiple agents in the storage area network to handle execution of a second set of management functions associated with the given device.

This technique of assigning multiple agents (rather than a single agent) different management functions alleviates a management control center from having to coordinate direct communications with and control many different types of devices (e.g., vendor devices) in the storage area network. Instead of relying on direct communications, the management control center indirectly controls the given network device through the agents. For example, in response to receiving a control command from a user at the management control center, the management control center transmits user-generated requests or commands to the respectively assigned SAN agents that, in turn, communicate with and control the given network device on behalf of the management control center.

One reason for assigning management functions associated with a given network device to multiple agents instead of a single agent is the ability of different agents to perform different management functions. That is, certain agents in a storage area network may be better suited for handling a first type of management function such as zoning management functions while other agents may be better suited for handling a second type of management functions such as low security management functions. Consequently, for a given network device, techniques herein involve assigning a first agent to handle a first type of associated management functions and assigning a second agent to handle a second type of management functions of the given device instead of assigning all storage area network management duties to a single agent.

Figure 1:
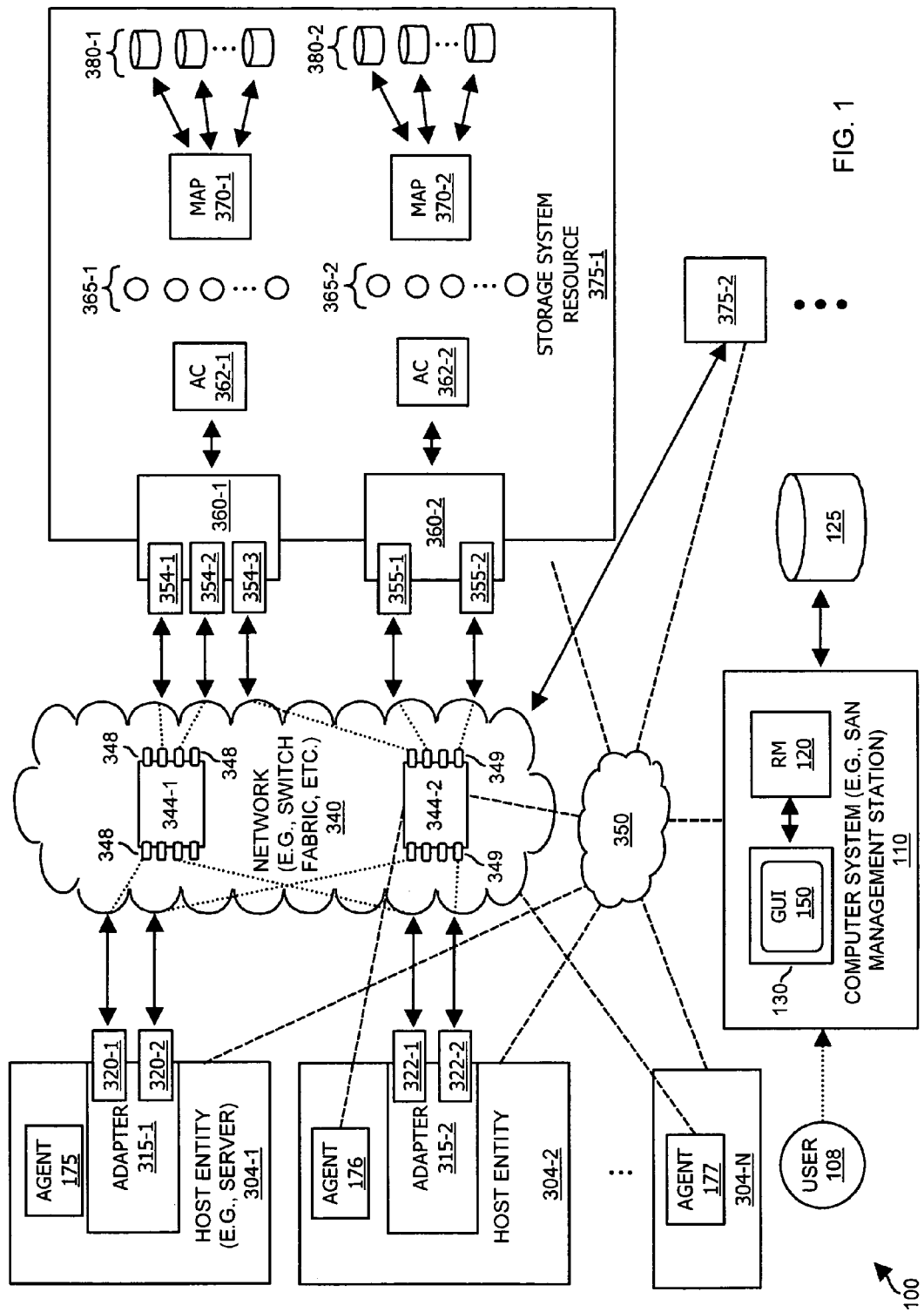
FIG. 1 is a block diagram of a storage area network and a management station configured to support assignment of management functions to multiple agents in a storage area network environment.

FIG. 1 is a block diagram illustrating connectivity of network resources (e.g., host resources, switch resources, and storage resources) in a storage area network 100 according to an embodiment of the present application. As shown, storage area network 100 includes host entity 304-1, host entity 304-2, . . . (collectively, host entities 304), network 340 (e.g., a high speed fiber-based switch fabric), network 350 (e.g., LAN, WAN, Internet, intranet, fiber-based fabric, etc.), storage system resource 375-1, storage system resource 375-2, . . . (collectively, storage system resources 375), computer system 110, and repository 125 (e.g., database, storage, etc.).

Network 340 includes switch device 344-1, switch device 344-2 which themselves have corresponding switch ports 348 and 349. Host entity 304-1 includes adapter 315-1 and corresponding port 320-1 and port 320-2 to communicate over network 340. Host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2. Host entity 304-1 executes agent 175; host entity 304-2 executes agent 176; and host entity 304-N executes agent 177. Storage area network 100 can include any number of agents, each of which may operate on any computerized device in the storage area network environment 100. For example, agents can reside in respective devices in network 340, network 350, etc.

In general, and as will be more particularly discussed, computer system 110 assigns multiple agents in storage area network environment 100 duties of supporting exclusive sets of management functions associated with switch devices 344. Based on the assignments, agents 175, 176, and 177 act on behalf of computer system 110 to control switch devices 344. Proper configuration and control of switches 344 ensures that host entities 304 may efficiently access data from storage system resources 375 on behalf of clients.

Agents can be distributed throughout storage area network environment 100 as shown. In one application, agents 175, 176, 177 run on respective host entities 304 that are not dedicated to serving data from storage area network environment 100 to corresponding clients. In other words, agents optionally run on host resources (e.g., host entities 304) that are at least partially dedicated to executing agents but not serving clients. Agents may also run on host entities that do serve data retrieved from storage system resources 375 to respective clients.

For illustrative purposes, computer system 110 (e.g., a management control center) is configured, in this example, as a storage area network management station operated by a user 108 such as a network manager responsible for managing resources in the storage area network 100. For example, computer system 110 executes a resource manager application 120 (e.g., a software graphical user interface application) that generates and displays information in accordance with embodiments of the present application as will be explained herein. The resource manager 120 may be any type of network management software application that executes, performs, or otherwise operates within computer 110 such as a computerized management station.

The management station computer system 110 (e.g., a computer device) includes a corresponding display 130 (e.g., a monitor or other visual display device) that resource manager 120 controls to display a graphical user interface 150. In general, graphical user interface 150 presented by a software application (e.g., resource manager 120) running on computer 110 enables user 108 to initiate execution of commands to associated devices such as switches 344 in storage area network environment 100. For example, a user 108 may provide input commands (e.g., selections by clicking on a mouse) to i) control information (e.g., tables, pop-up screens, etc.) displayed on display 130 and ii) request an agent 175 (or other agents as is generally the case throughout this document) to perform a management function (e.g., configuration of switches 344).

In one application, resource manager 120 initiates discovery or rediscovery of management capabilities associated with resources (e.g., agents, applications, interfaces such as management application programming interfaces, etc.) in storage area network environment 100 without being prompted by a user 108. For example, resource manager 120 periodically or occasionally executes a discovery/rediscovery as a regular course of business to learn of configurations, supported operations, etc. associated with devices in the storage area network environment 100. In response to learning new management capabilities associated with agents, the computer system 110 can assign/reassign the agents 175, 176, and 177 different management functions or duties.

In one embodiment, the agents in storage area network 100 operate on behalf of the management control center and utilize a respective address to communicate with and query a corresponding network device about its corresponding supported set of operations. For example, based on a configuration of a network device, the agents learn of management capabilities (i.e., operations that an agent, application, interface, entity are able to perform on the corresponding network device) they support. Accordingly, in one application, the network devices do not provide a direct report of management capabilities to the agents. Instead, the network devices provide configuration information and other data enabling an agent (or network management station, application, interface, etc.) to conclude what operations can be performed on a given network device. However, in other embodiments, the agents may directly query the network devices to learn of operations that they support.

In one embodiment, management capabilities include operations that an application, agent, specific interface, etc. are able to perform on a specific network device. In certain cases, an ability to implement management capabilities depends on a status, state or configuration of the network device. For example, a status of the network device may affect the ability of the application, agent or interface to manage the device. In one application, management capabilities refers to an ability of a device to transfer data or provide some other functionality, not necessarily how the device can be managed by an application although certain applications encompass this concept as well. That is, management capabilities may extend to cover operations supported by a corresponding network device.

Computer system 110 and, more particularly, resource manager 120 stores learned attributes associated with storage area network environment 100 in repository 125. Based on management capabilities reported by agents 175, 176, and 177 to computer system 110, resource manager 120 notifies (e.g., via a display screen 130 of selectable options in graphical user interface 150) user 108 of management functions that can be performed on resources (e.g., switch devices) in the storage area network environment 100.

Note again that storage area network environment 100 enables host entities 304 (e.g., servers, etc.) to access data in storage system resources 375 on behalf of clients coupled to or through the host entities 304. However, as discussed, certain host entities 304 are optionally dedicated to running agent applications rather than server applications for serving data to clients.

The following discussion illustrates how certain host entities 304 serve data to clients. For example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a data path (e.g., a zone) between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Typically, selected host entities 304 are limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone defines a group of resources in the network providing a logical path i) through a switch resource 302 and ii) between a host resource 301 and a storage array resource 303. Thus, in some respects, a zone defines a logical data flow path in the storage area network environment 100.

As discussed, computer system 110 assigns agents 175, 176, and 177 different management functions to more effectively support configuration of storage area network environment 100. Accordingly, agents 175, 176, and 177 in storage area network environment 100 enable user 108 to configure the storage area network environment 100 so that host entities can more efficiently access data on behalf of corresponding clients. That is, agents enable the computer system 110 and corresponding user 108 to more efficiently manage devices in storage area network environment 100.

Figure 2:
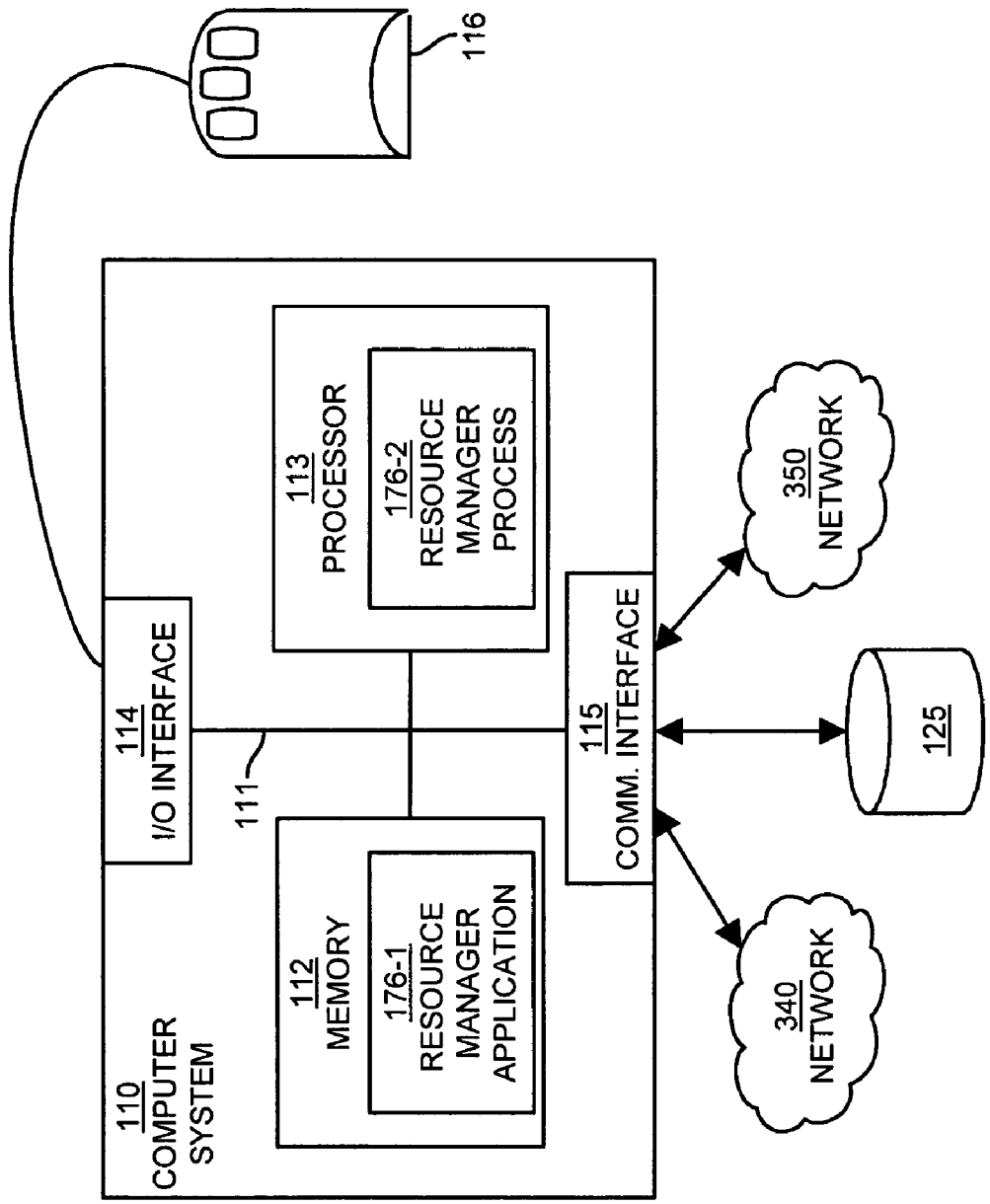
FIG. 2 is a block diagram of a processing device suitable for executing a resource manager process and an agent process according to an embodiment of the present application.

FIG. 2 is a block diagram illustrating an example architecture of a computer system 110 for executing a resource manager application 120 according to embodiments of the present application. Computer system 110 may be a computerized device such as a personal computer, workstation, portable computing device, console, network terminal or the like. As shown, computer system 110 of the present example includes an interconnect 111 that couples a memory system 112, a processor 113, I/O interface 114, display 130, and a communications interface 115. Peripheral devices 116 (e.g., one or more optional user controlled devices such as a keyboard, mouse, display screens, etc.) couple to processor 113 through I/O interface 114.

Communications interface 115 of computer system 110 enables computer system 110 to communicate over network 340 and network 350 with other devices (i.e., resources) associated with storage area network environment 100 as well as access repository 125.

As shown, memory system 112 is encoded with a resource manager application 120-1 supporting assignment of management capabilities associated with a network device in storage area network environment 100. Resource manager application 120-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application) performing within or upon the processor 113 in the computer system 110.

It should be noted that the resource manager 120 (in FIG. 1) executed in computer system 110 can be represented by either one or both of the resource manager application 120-1 and/or the resource manager process 120-2. For purposes of the discussion of the operation of embodiments of the present application, general reference will be made to the resource manager as performing or supporting the various steps and functional operations to carry out the features of embodiments of the present application.

It should be noted that, in addition to the resource manager process 120-2, embodiments of the present application also include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the present application include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Note that agents 175, 176, and 177 can operate on respective host entities 304 in a similar manner as discussed above for resource manager 120 operating on computer system 110. That is, host entities 304 can include respective memory systems, processors, and interfaces to support execution of agent applications to produce respective agent processes.

Figure 3:
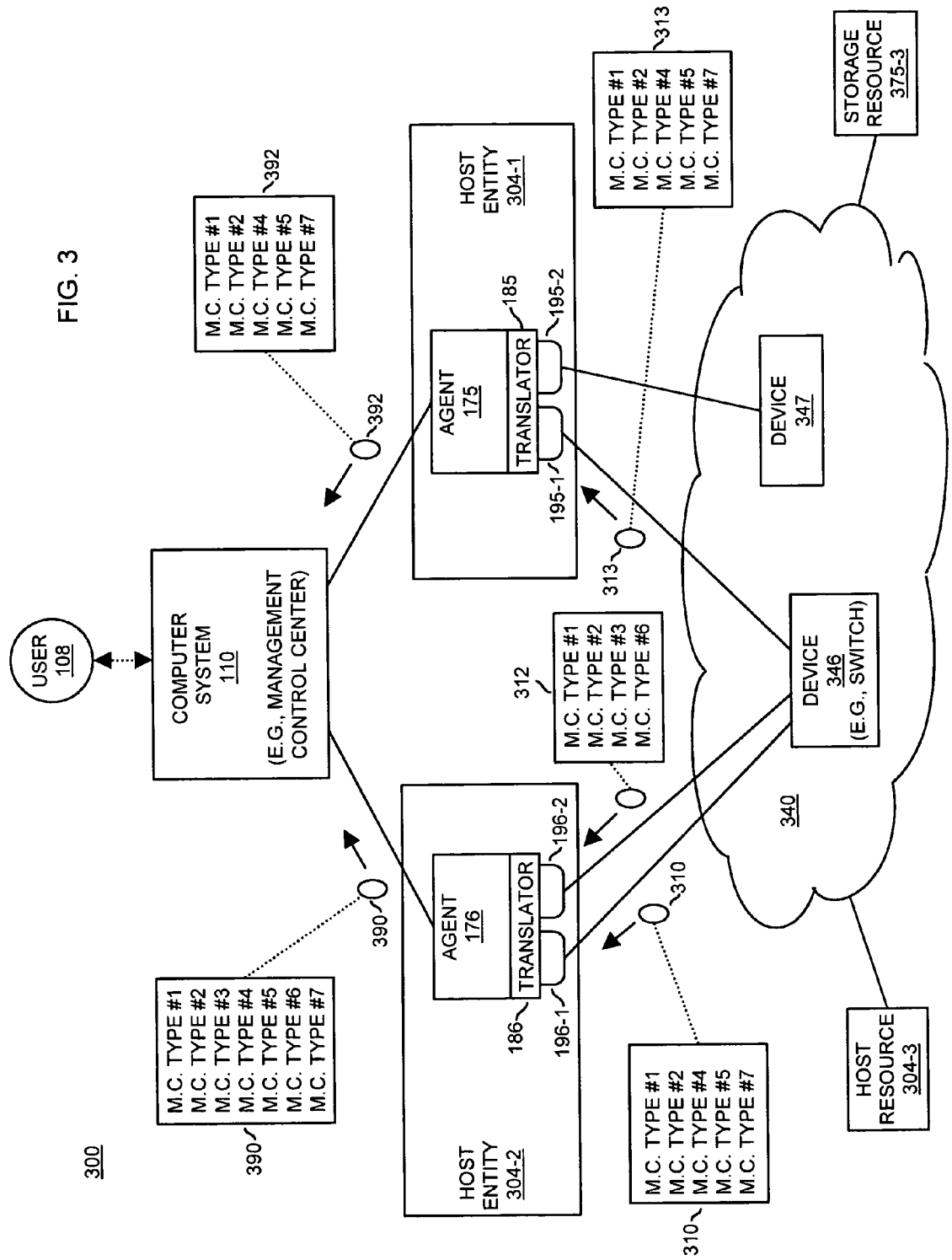
FIG. 3 is a diagram illustrating how one or more agents in a storage area network discovers attributes of storage area network devices and forwards the learned attributes to a central computer.

FIG. 3 is a diagram illustrating a technique supporting discovery a configuration associated with device 346 in storage area network environment 300. As shown, computer system 110 discovers management capabilities (e.g., what functions the agents are able to support) by different agents 175 and 176 in storage area network environment 300 prior to assigning the agents different management responsibilities. For example, according to one application, a user 108 clicks on a resource displayed in graphical user interface 150 to select a resource (e.g., an agent) in storage area network environment 300 for discovering corresponding attributes such as management capabilities.

Assume for purposes of this discussion that user 108 selects device 346 for discovery of its configuration or operations that it supports. In such an instance, user 108 may be prompted by computer system 110 to provide (either previously or during the selection of the resource) computer system 110 with one or more management addresses associated with device 346.

Computer 110 forwards the management address (e.g., a network address associated with device 346 in the storage area network environment 300) to agents 175 and 176 in the storage area network environment 300. The agents 175 and 176 operate on behalf of the management control center (i.e., computer 110) and utilize the management address (or addresses) to communicate with and query corresponding device 346 about its corresponding configuration and supported operations.

As shown, agents 175 and 176 can include one or multiple interfaces (e.g., management application programming interface 196-1 and management application programming interface 196-2 associated with agent 176 and management application programming interface 195-1 associated with agent 175) on which to communicate with device 346. For example, a first interface 196-1 of the agent 176 may support SNMP (Simple Network Management Protocol) type communications with the target network device 346 being queried; another interface 196-2 of the agent 176 may support FAL (Fabric Access Layer) type communications with the target network device 346, and so on. Agent 175 communicates with device 346 via use of management application programming interface 195-1 and respective protocols to learn of a configuration associated with device 346.

In addition to supporting discovery of management functions supported by network devices in storage area network environment 300, in a reverse direction, the agents' management application programming interfaces can support execution of generic management commands initiated by user 108 and received from computer 110. For example, respective translators 185 and 186 (e.g., an ESNAPI interface which is an internal library developed by EMC) of agents 175 and 176 support translation of the generic commands from computer 110 into specific vendor type commands understood by the target devices in storage area network environment 300 being managed. Assignment of management responsibilities will be discussed in connection with FIG. 4.

Referring again to FIG. 3, management capabilities (a.k.a., management functions) associated with devices in storage area network environment 300 can cover a broad spectrum of management features associated with SAN resources. Examples of management capabilities include: discovery of connectivity device references, adapters, ports and topology, monitoring of statistics, discovery of fabric, zoning (inactive and active), zone control, registration of asynchronous events, receiving asynchronous events, etc. Management functions supported by agents 175 and 176 may extend to configuring a respective target network device 346 based on these and other device features.

As discussed, agents 175 and 176 include management application programming interfaces 195 and 196 for interrogating devices 346, 347, etc. about their respective configurations. In general, management application programming interfaces of respective agents can support communications such as those based on i) SNMP (Simple Network Management Protocol), ii) FAL (Fabric Access Layer), iii) SMI (Storage Management Interface), and iv) FC_SWAPI (Fibre Channel SWitch Application Programming Interface), etc. As mentioned, communications via such protocols enable discovery of device attributes (e.g., management capabilities) such as configuration, its name, name of resources in the device, connectivity paths, zone information, vendor type, etc.

Each of multiple independently operating management application programming interfaces 195 and 196 can support discovery and execution of different types of operations with respect to a given network device 346 being queried. For example, the SNMP protocol enables discovery of low security information (e.g., configuration information) associated with device 346. Typically, most vendor devices support the SNMP protocol. On the other hand, a specific protocol such as the FAL protocol supports communications with devices manufactured by Brocade™ and enables discovery of more advanced configuration information such as zoning, which may not be presently supported by the SNMP protocol. The SWAPI protocol supports discovery of nicknames (instead of World Wide Names) associated with a queried device. Thus, different protocols associated with respective management application programming interfaces support discovery and control of different types of management capabilities or functions.

Although most equipment being queried in the storage area network environment 300 supports the SNMP protocol, certain protocols are supported only by equipment of a particular vendor type. For example, Brocade™ switches quite often support out-of-band management communications via FAL in addition to SNMP. Thus, a target device such as device 346 can be interrogated, controlled, etc. via use of multiple protocols such as FAL and SNMP.

In the example shown, based on communications (e.g., an agent sending query messages to device 346) via respective management application programming interfaces 196, the agent 176 learns that a first interface 196-1 of the agent 176 supports a first set of management capabilities 310 including management capability types 1, 2, 4, 5, and 7, and that a second interface 196-2 of the agent 176 supports a second set of management capabilities 312 including management capability types 1, 2, 3, and 6, and so on. As an example, management capability type 1 may pertain to fabric connectivity status; management capability 2 may pertain to device nickname discovery; management capability type 3 may pertain to zoning functions; etc. Note that in certain cases, agent need not query device 346 and can identify management capabilities supported by a respective network device based on a vendor type, model, software versions, etc. associated with device 346.

For a given interrogation of network device 346, each of agents 175 and 176 reports learned management capabilities for each of the respective multiple management application programming interfaces 195 and 196 to the computer system 110. Thus, computer system 110 receives reports of management capabilities from multiple different agents in the storage area network environment 300. Consequently, the management control center learns which of multiple agents in a storage area network environment 300 to contact in order to initiate different operations associated with network devices in the storage area network environment 300.

Note that agents may combine sets of management capabilities into a single set before forwarding them to computer system 110. For example, as shown, agent 176 combines the a first set of management capabilities 310 and the second set of management capabilities 312 and forwards a set of overall management capabilities 390 to computer 110. The set of overall management capabilities 390 includes a non-duplicated set of management capability types 1, 2, 3, 4, 5, 6, and 7. In other words, set of management capabilities 390 includes a combination of functions supported by both management application programming interfaces 196. Agent 175 forwards set of management capabilities 392 to computer system 110.

Higher up the chain of communication, computer system 110 combines management capabilities set 390 and management capabilities set 392 to produce an overall set of management capabilities supported by device 346. In this case, the combined management capabilities includes management capability types 1, 2, 3, 4, 5, 6, and 7. Via resource manager 120, computer system 110 can then display to user 108 via graphical user interface 150 a set of management capabilities that can be initiated by user 108 via agents 175 and 176.

Figure 4:
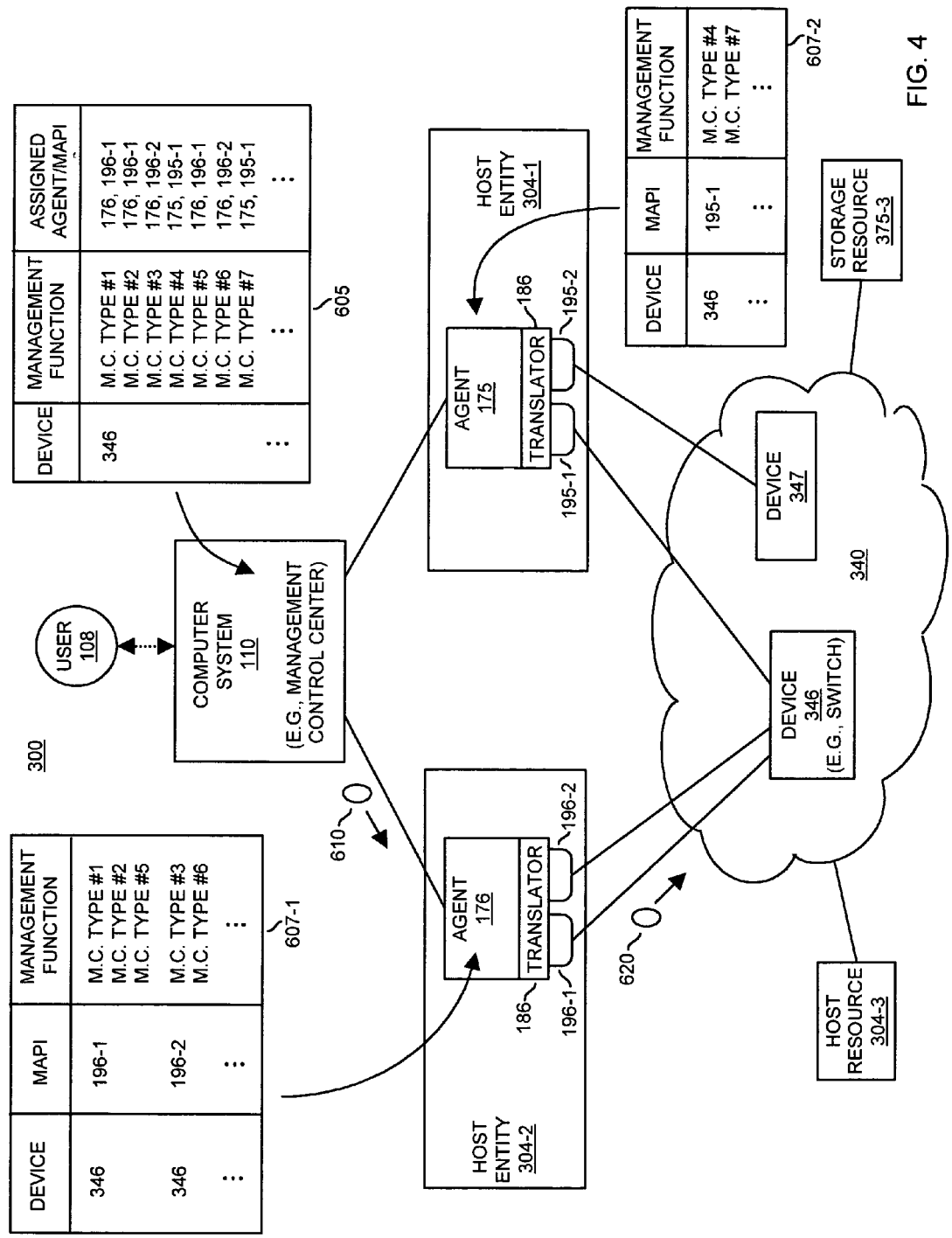
FIG. 4 is a diagram illustrating assignment of management functions to multiple agents in a storage area network.

FIG. 4 is a diagram illustrating an assignment of management responsibilities to different agents and execution of commands (e.g., management commands) via agents in storage area network environment 300. Storage area network environment 300 in FIG. 4 includes similar resources as shown in FIG. 3 and FIG. 1.

After receiving an indication of agents 175 and 176 existing in storage area network environment 300 as well as corresponding management application programming interfaces 195 and 196 and which management responsibilities they can support, computer system 110 assigns management responsibilities to different agents in storage area network environment 300. For example, as previously discussed, computer system 110 receives an indication that agent 176 (via its management application programming interfaces 196) supports management capability type 1, 2, 3, 4, 5, 6, and 7. Computer system 110 also receives an indication that agent 175 (via its management application programming interfaces 195) supports management capability type 1, 2, 4, 5, and 7. Thereafter, computer system 110 assigns the agents to handle different management responsibilities.

In one application, computer system 110 generates table 605 reflecting assignment of management responsibilities to the agents for different devices in network 340. For example, for device 346, computer system 110 assigns agent 176 to handle management capability types 1, 2, 3, 5, and 6. Additionally, computer system 110 assigns agent 175 to handle management capability types 4 and 7. Computer system 110 may further assign a particular management application programming interface of a respective agent to handle a particular management responsibility. For example, computer system 110 assigns management application programming interface 196-1 of agent 176 to handle a respective management responsibility associated with management capability type #1, computer system 110 assigns management application programming interface 196-1 of agent 176 to handle a respective management responsibility associated with management capability type #1, computer system 110 assigns management application programming interface 196-2 of agent 176 to handle a respective management responsibility associated with management capability type #1, computer system 110 assigns management application programming interface 195-1 of agent 175 to handle a respective management responsibility associated with management capability type #1, and so on as shown.

In the event that computer system 110 assigns only an agent and not a respective management application programming interface to handle a management responsibility, a respective agent may determine which management application programming interface to use when requested to execute a corresponding management responsibility on behalf of computer system 110.

In one application, computer system balances the assignment of management functions to different agents in storage area network environment 300 based on load balancing factors. That is, computer system 110 assigns management responsibilities to different agents in storage area network environment 300 so that no one agent in storage area network environment 300 is burdened to the extent that it is not able to efficiently handle execution of management functions on behalf of computer system 110 (e.g., management control center).

Upon completion of assignment of management responsibilities and tracking of same in table 605, computer system 110 notifies the different agents in storage area network environment 300 of their assigned management responsibilities. For example, computer system 110 notifies agent 176 that it is responsible for handling commands associated with management capability types 1, 2, 3, 5, and 6. In a similar vein, computer system 110 notifies agent 175 that it is responsible for handling commands associated with management capability types 4 and 7. Computer system 110, as in this example case shown, assigns the agents 175 and 176 management responsibilities so that they do not overlap with each other. Thus, instead of assigning all management responsibilities to a single agent in storage area network environment 300, computer system 110 splits management responsibilities among two or more different agents.

A possible reason for splitting an assignment of management responsibilities in storage area network environment 300 is to provide more efficient handling of commands. For example, certain agents may be better suited for handling commands via respective protocols supported by their management application programming interfaces. Accordingly, in such circumstances, computer system 110 may assign management responsibilities depending on how well an agent can handle a type of management responsibility. Assignment of management responsibilities by the computer system 110 also may be based on load-balancing considerations so that no one agent or management application programming interface is overloaded with management responsibilities.

As discussed, computer system 110 assigns each agent in the storage area network environment 300 to handle one or more management responsibilities associated with a device. The computer system 110 may further assign backup agents to handle the management responsibilities in the event that a primary assigned agent is unable to handle a management responsibility on behalf of computer system 110.

Via table 607-1 and 607-2, respective agents keep track of which devices they support (based on information provided by computer system 110) and corresponding management application programming interfaces that are to be used to handle execution of respective management responsibilities. In the event that computer system 110 specifies which agent and/or management application programming interface to use, there may be no need for the agents to maintain tables 607-1 and 607-2. For example, the computer system 110 optionally notifies an agent of a management application programming interface to use at a time of initiating execution of a command from computer system 110.

Note that in certain situations, agents may execute processes with respect to an assigned management responsibility prior to actually receiving a command from the computer system 110 to execute a given command. These pre-running processes can provide necessary initialization of states, handshaking, etc. so that a command, when received and handled by a respective agent, executes more quickly and efficiently.

As discussed, after assigning management functions to different agents in storage area network environment 300, computer system 110 keeps track of management functions (e.g., commands) supported by different agents via table 605. For example, table 605 indicates which agent and respective management application programming interface in storage area network environment 300 to forward commands for execution. Accordingly, when user 108 initiates selection and execution of a generic command (or, in the alternative, a vendor specific command) presented to the user 108 as being an option for execution as displayed in graphical user interface 150, resource manager 120 consults table 605 to identify which agent to send the generic command. As discussed, in one application, table 605 only includes a list of agents assigned to handle certain types of management functions. The corresponding agents in storage area network environment 300 include respective tables 607-1 and 607-2 to determine which respective management application programming interface on which to execute the management function. Computer system 110 may also identify which management application programming interface to use based on entries in table 605.

In the example shown, for a given command selected by user 108 and targeted to device 346, computer 110 identifies the device to which the command is directed. For purposes of this discussion, assume that user 108 selects a command (of management function type #5) to manage an attribute of device 346. Resource manager 120 forwards the command 610 to the appropriate agent 176 and management application programming interface 196-1 identified in table 605. For example, resource manager 120 first identifies that the command 610 selected by user 108 is directed toward device 346. Additionally, resource manager 120 identifies that command is of management capability type #5. Based on the appropriate entry (e.g., the entry for management capability type #5) in table 605, computer 110 transmits generic command 610 to agent 176 in host entity 304-2. A similar procedure is used to transmit other types of commands to different agents based on contents of table 605.

As briefly discussed above, agent 176 includes translator 186 (e.g., an ESNAPI interface—Enterprise Storage Network Application Programming Interface, a library developed by EMC) to convert generic command 610 into corresponding vendor specific commands understood by a target device 346. Upon receipt of command 610, agent 176 identifies a specific management function associated with the generic command 610 and thereafter consults a corresponding table 607 to identify a particular management application programming interface 196 (if the management application programming interface is not already identified in the received command) of a respective agent to handle execution of the command on behalf of computer system 110. As shown, execution of command 610 at agent 176 includes translating the command 610 using translator 186 and communicating corresponding messages 620 through management application programming interface 196-1 to device 346 to initiate execution of the command 610 at device 346.

In contrast to the above technique of the computer system 110 notifying an agent which management application programming interface to use for execution, in certain cases, table 607-1 may not indicate which management application programming interface to use. Under such circumstances, the agent 176 performs an analysis to determine which of the management application programming interfaces 196 to initiate execution of the generic command 610. In one application, the agent 176 chooses a management application programming interface 196 that can perform execution of the generic command faster than the other agents. In another application, the agent 176 itself decides which management application programming interface to use based on a load-balancing function so that neither management application programming interface 196 is overwhelmed with communication traffic.

Resource manager 120 can display table 605 to a user 108 via graphical user interface 150. Displaying management capabilities, configuration information of operational capabilities (as well as management addresses of corresponding devices in the storage area network environment 100) to a user 108 via graphical user interface 150 serves a number of useful purposes. For example, providing a display of configuration and/or management capabilities and related information in table 605: i) enables the user 108 to identify available functionality supported by devices (e.g., device 346) in storage area network environment 300, ii) troubleshoot problems such as an inability of an agent to perform a management function, iii) choose an address template to obtain more functionality associated with a device, iv) primary agent assignment, v) tuning connectivity configurations, etc.

As previously discussed, assignment of which agents in storage area network environment 300 handle each of the management responsibilities can involve assigning agents to handle different management responsibilities based on performance attributes of a respective host entity 304 on which the agents reside. In addition to this technique, assignment of management responsibilities can be based on other system attributes such as a i) vendor type associated with a network device, ii) types of communication interfaces (e.g., a management application programming interface and supporting protocols) associated with an agent, iii) an ability of an agent to communicate with a target device, etc.

More specifically, the computer system 110 can identify a vendor type associated with the device 346. Assume, for example, that device 346 is a switch manufactured by Brocade™. Such a switch may support certain communication protocols such as SNMP and FAL. Depending on the vendor type associated with device 346, the computer system 110 selects agent 175 and 176 among multiple agents to handle execution of the management functions because such agents support the SNMP and FAL protocols.

In one application, computer system 110 receives information about interfaces (e.g., management application programming interfaces) associated with each of the multiple agents. The information can include an indication of corresponding protocols supported by the interfaces. In addition to SNMP and FAL, agents in storage area network environment 300 may support other protocols such as SMI (Storage Management Interface), SWAPI (SWitch Application Programming Interface), etc. Depending on communication protocols supported by device 346, the computer system 110 selects appropriate agents among multiple agents having corresponding one or more management application programming interfaces to handle communications and execution of the management functions. Typically, agents having multiple management application programming interfaces capable of communicating with a network device via multiple respective protocols can support a wider range of management responsibilities.

In yet another application, computer system 110 assigns an agent to be responsible for handling execution of the first set of management functions based on an ability of an agent to communicate with and control the device compared to abilities of other agents to communicate with and control the device. In other words, if an agent can efficiently support communications with a target device 346, it is more likely to be assigned duties of handling corresponding management responsibilities. For example, the ability of agents to communicate with a device can be based at least in part on a respective number of node hops required to communicate between a host entity 304 on which a respective agent resides and the target device 346 for which management responsibilities are being assigned. The fewer the node hops between an agent and a target device being managed, the higher the likelihood that the agent can more efficiently handle management responsibilities associated with the target device.

Functionality supported by computer system 110 and, more specifically, resource manager 120 and agents 175 and 176 will now be discussed via flowchart 500 in FIG. 5. Note that there will overlap with respect to concepts discussed above for FIGS. 1 through 4. Of course, the steps need not be executed in the order shown.

Figure 5:
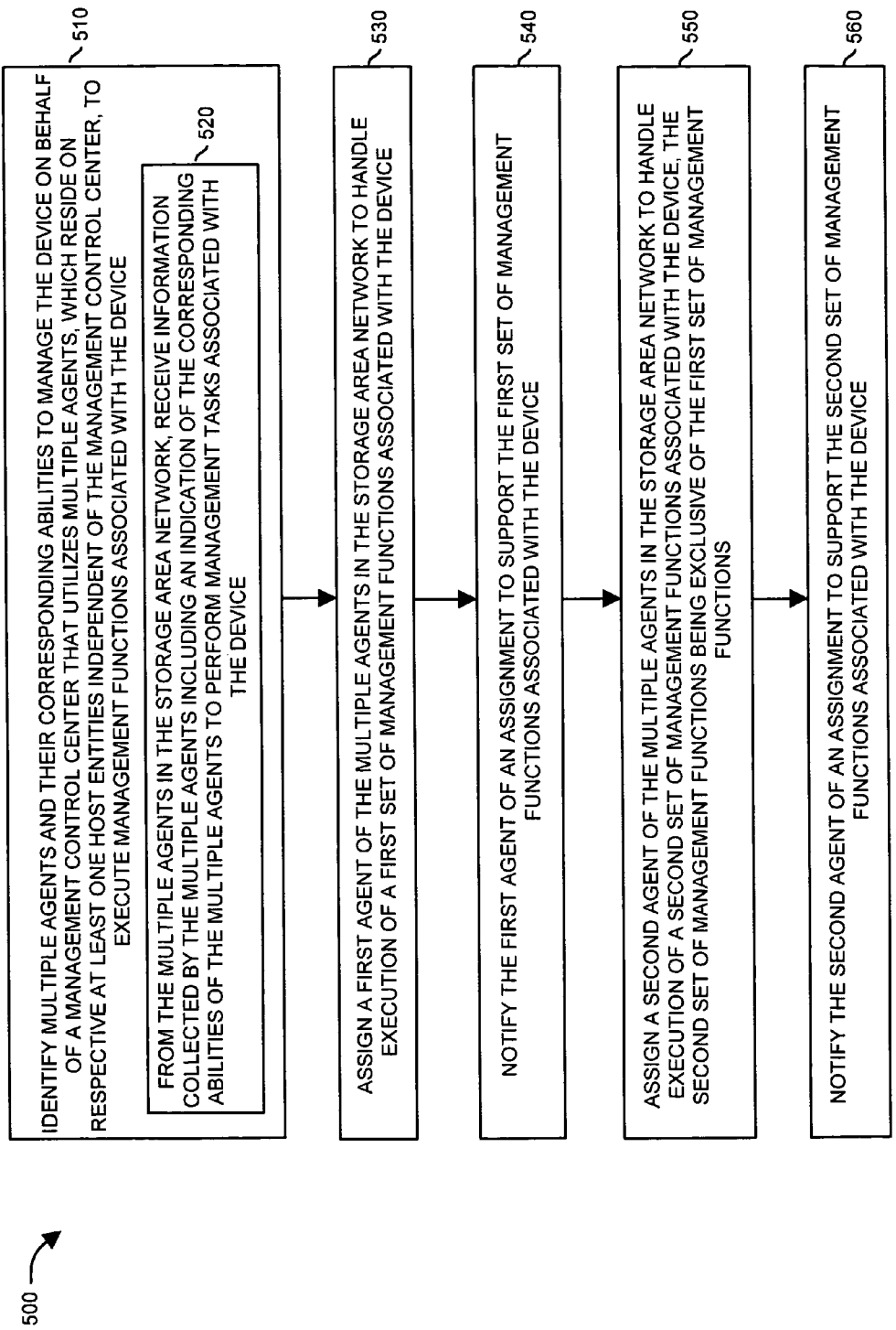
FIG. 5 is a flowchart illustrating a technique of assigning management functions to multiple agents in a storage area network environment.

FIG. 5 is a flowchart 500 illustrating a technique of assigning management responsibilities to different agents in storage area network environment 300.

In step 510, computer system 110 identifies multiple agents such as a agents 175 and 176 and their corresponding abilities to manage the device 346 on behalf of a management control center (e.g., computer system 110) that utilizes multiple agents to execute management functions associated with the device 346. As discussed, the agents reside on host entities 304 that are independent of the management control center.

In sub step 520, from the multiple agents in the storage area network environment 300, computer system 110 receives information collected by the multiple agents 175 and 176 including an indication of the corresponding abilities of the multiple agents to perform management tasks associated with the device 346 (and other devices 347, etc. in network 340).

In step 530, computer system 110 assigns a first agent (e.g., agent 176) of the multiple agents in the storage area network environment 300 to handle execution of a first set of management functions (e.g., management capability types 1, 2, 3, 5, and 6) associated with the device 346.

In step 540, computer system 110 notifies the first agent (e.g., agent 176) of an assignment to support the first set of management functions (e.g., management capability types 4 and 7) associated with the device 346.

In step 550, computer system 110 assigns a second agent (e.g., agent 175) of the multiple agents in the storage area network environment 300 to handle execution of a second set of management functions (e.g., management capability types 4 and 7) associated with the device. As discussed, in one application, the second set of management functions assigned to agent 175 is exclusive of the first set of management functions assigned to agent 176.

In step 560, computer system 110 notifies the second agent (e.g., agent 175) of an assignment to support the second set of management functions (e.g., management capability types 4 and 7) associated with the device 346.

Figure 6:
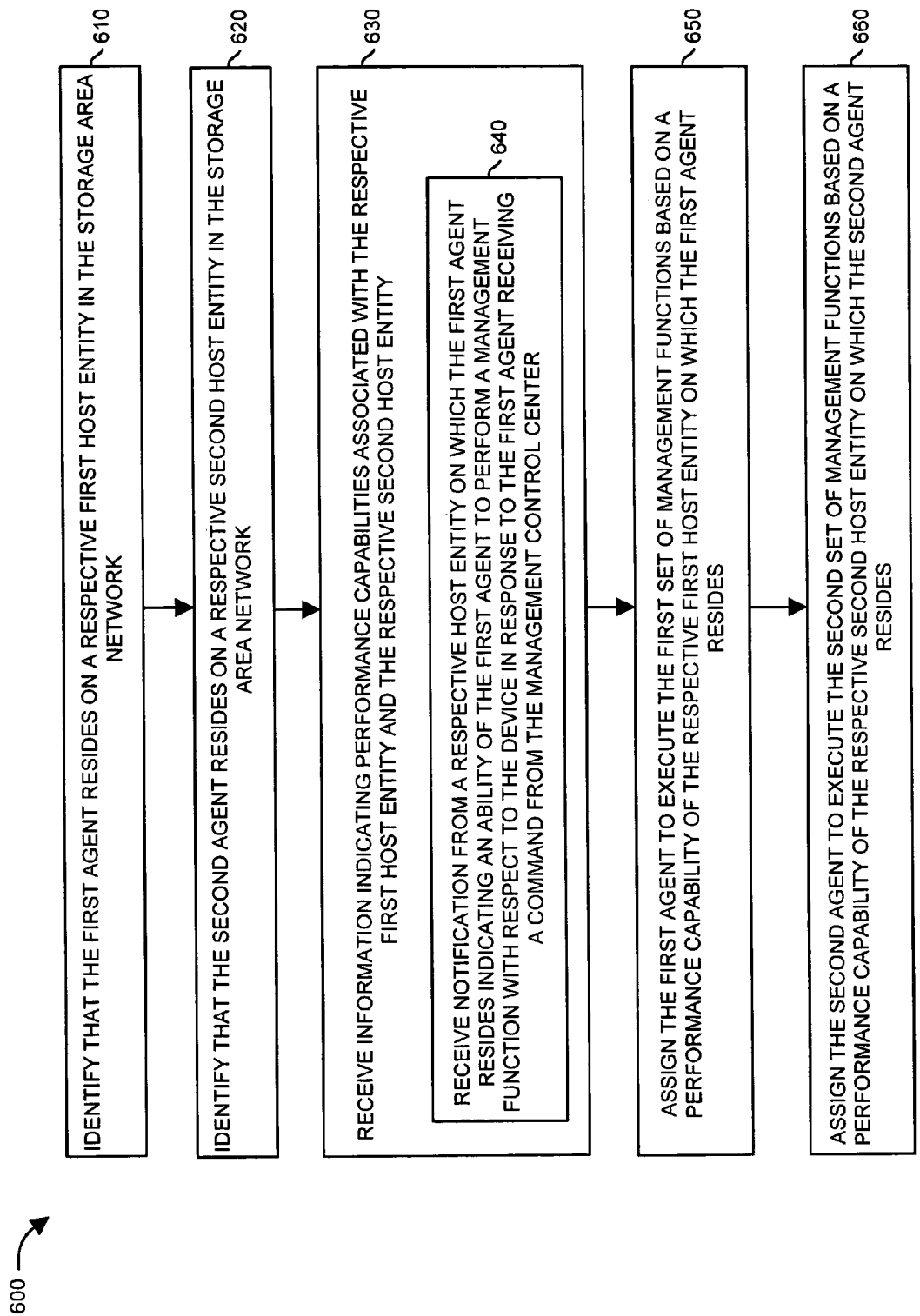
FIG. 6 is a flowchart illustrating a technique of determining how management functions are assigned to different agents in a storage area network environment.

FIG. 6 is a flowchart 600 illustrating a further technique of assigning management capabilities to different agents in storage area network environment 300 based on performance capabilities of the host entities 304 on which the agents reside.

In step 610, computer system 110 identifies that agent 176 resides on respective host entity 304-2 in the storage area network environment 300.

In step 620, computer system 110 identifies that agent 175 resides on respective host entity 304-1 in the storage area network environment 300.

In step 630, computer system 110 receives information indicating performance capabilities associated with respective host entity 304-1 and host entity 304-2.

In sub-step 640, computer system 110 receives notification from a respective host entity on which agent 176 resides indicating an ability of agent 176 to perform a management function with respect to the device in response to agent 176 receiving a command from computer system 110 (e.g., management control center).

In step 650, computer system 110 assigns agent 176 a responsibility of executing the first set of management functions based on a performance capability of the respective host entity 304-2 on which the agent 176 resides.

In step 660, computer system 110 assigns agent 175 a responsibility of executing the second set of management functions based on a performance capability of the respective host entity 304-1 on which the agent 175 resides.

Figure 7:
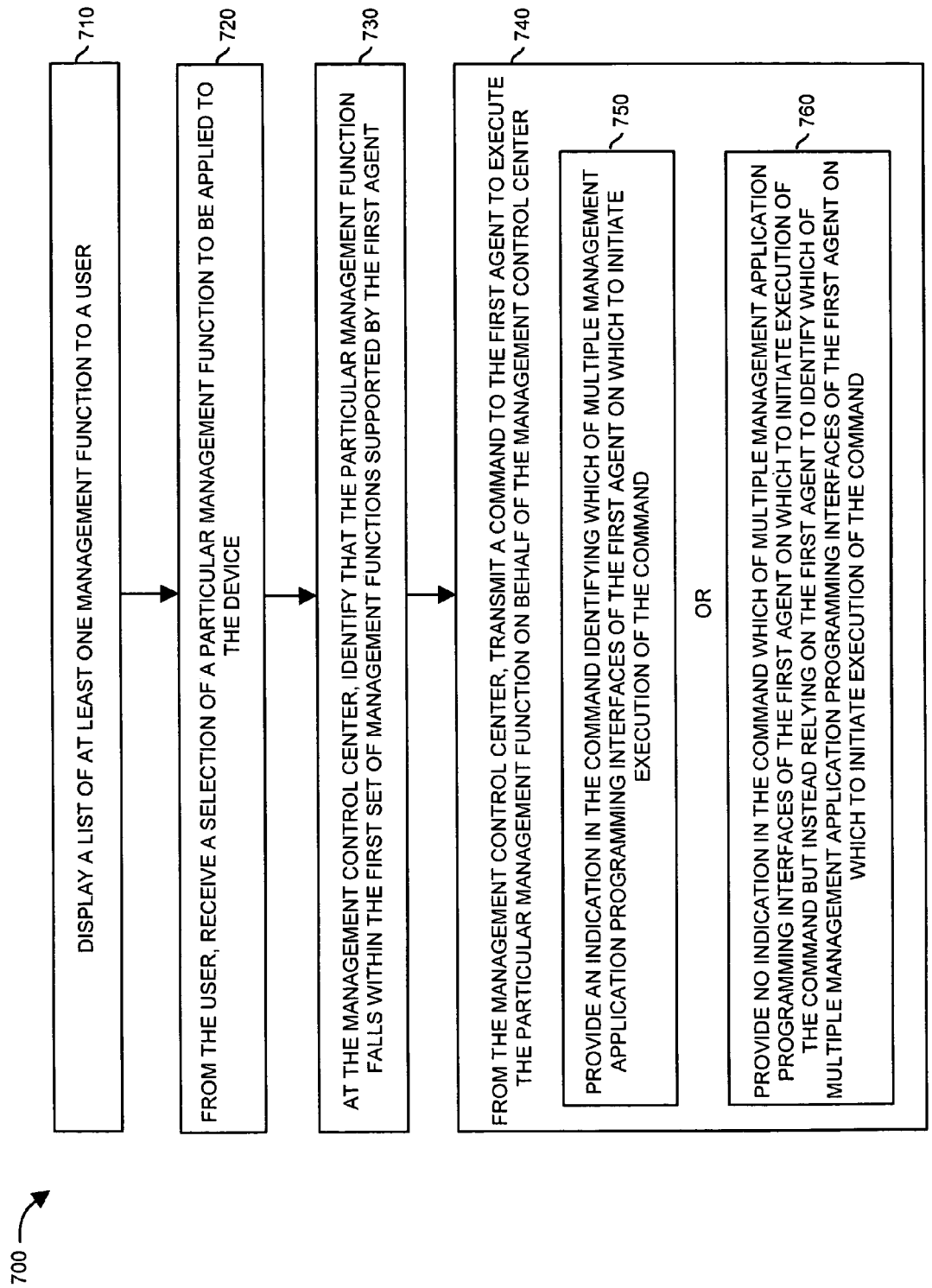
FIG. 7 is a flowchart illustrating a technique of executing a user-generated command via use of one of multiple agents distributed throughout a storage area network environment.

FIG. 7 is a flowchart 700 illustrating a technique of utilizing assigned agents to execute management responsibilities according to the present application.

In step 710, computer system 110 initiates display of a list of at least one management function to a user 108 via graphical user interface 150.

In step 720, computer system 110 receives a selection from user 108 of a particular management function or command 610 to be applied to the device 346.

In step 730, via use of table 605, computer system 110 identifies that the particular management function falls within the first set of management functions supported by the agent 176.

In step 740, computer system 110 transmits a command 610 (or series of messages) to agent 176 to execute the particular management function on behalf of the computer system 110.

In step 750, computer system 110 provides an indication in the command 620 identifying which of multiple management application programming interfaces 196 of agent 176 on which to initiate execution of the command 610.

In the alternative to step 750, in step 760, computer system 110 provides no indication in the command which of multiple management application programming interfaces of the agent on which to initiate execution of the command but instead relies on the agent to identify which of multiple management application programming interfaces of the first agent on which to initiate execution of the command based on table 607-1.

As discussed, techniques of the present application are well suited for use in systems in which a management control center discovers management capabilities of multiple different vendor types of devices in a storage area network and the management control center assigns agents distributed in the storage area network different duties of communicating with and controlling the devices. However, it should be noted that embodiments of the present application are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method of assigning management of a device in a storage area network to multiple agents, the method comprising:

identifying multiple agents and their corresponding abilities to manage the device on behalf of a management control center that utilizes multiple agents, which reside on respective at least one host entities independent of the management control center, to execute management functions associated with the device;

assigning a first agent of the multiple agents in the storage area network to handle execution of a first set of management functions associated with the device;

assigning a second agent of the multiple agents in the storage area network to handle execution of a second set of management functions associated with the device, the second set of management functions being exclusive of the first set of management functions;

initiating display of a list of at least one management function to a user;

from the user, receiving a selection of a particular management function to be applied to the device;

at the management control center, identifying that the particular management function falls within the first set of management functions supported by the first agent; and from the management control center, transmitting a command to the first agent to execute the particular management function on behalf of the management control center.

2. A method as in claim 1, wherein identifying multiple agents and their corresponding abilities to manage includes:

from the multiple agents in the storage area network, receiving information collected by the multiple agents including an indication of the corresponding abilities of the multiple agents to perform management tasks associated with the device.

3. A method as in claim 2 further comprising:

notifying the first agent of an assignment to support the first set of management functions associated with the device; and notifying the second agent of an assignment to support the second set of management functions associated with the device.

4. A method as in claim 1 further comprising:

providing a notification to the first agent and the second agent that they are assigned as respective primary agents for supporting different management functions associated with the device, the notification prompting the agents to run management programs to communicate with the device prior to the respective primary agents receiving user-generated commands from the management control center to perform management functions with respect to the device.

5. A method as in claim 1, wherein assigning the first agent in the storage area network to handle execution of the first set of management functions and assigning the second agent in the storage area network to handle execution of the second set of management functions includes:
   identifying a type associated with the device; and
   selecting the first agent and the second agent amongst multiple agents to handle execution of the management functions in response to determining that the first agent and the second agent are particular device agents suited to support the type associated with the device.

6. A method as in claim 5, wherein the first agent and the second agent support a communication protocol based on at least one of:
   i) SNMP (Simple Network Management Protocol),
   ii) FAL (Fabric Access Layer),
   iii) SMI (Storage Management Interface), and
   iv) FC_SWAPI (Fibre Channel SWitch Application Programming Interface).

7. A method as in claim 1 further comprising:
   receiving information about interfaces available at each of the multiple agents, the information including an indication of corresponding protocols supported by the interfaces; and
   wherein assigning the first agent occurs in response to identifying that the first agent includes at least one interface for supporting communications with the device.

8. A method as in claim 1, wherein assigning the first agent to handle execution of the first set of management functions occurs in response to identifying that the first agent includes at least two protocol interfaces, each of which supports communications from the first agent to the device.

9. A method as in claim 1, wherein assigning the first agent includes:
   assigning the first agent to be responsible for handling execution of the first set of management functions based on an ability of the first agent to communicate with and control the device compared to abilities of other agents to communicate with and control the device.

10. A method as in claim 9, wherein abilities of the first agent and the other agents to communicate with the device is based at least in part on a respective number of node hops required to communicate between a host entity on which a respective agent resides and the device.

11. A method as in claim 1, wherein transmitting the command to the first agent includes:
   providing an indication in the command identifying which of multiple management application programming interfaces of the first agent on which to initiate execution of the command.

12. A method as in claim 1 further comprising:
   from the management control center, providing no indication in the command which of multiple management application programming interfaces of the first agent on which to initiate execution of the command but instead relying on the first agent to identify which of multiple management application programming interfaces of the first agent on which to initiate execution of the command.

13. A method as in claim 1 wherein the command is a generic command transmitted to the first agent, the first agent converting the generic command to vendor specific commands used to communicate with the device and execute a respective management function.

14. A method of assigning management of a device in a storage area network to multiple agents, the method comprising:
   identifying multiple agents and their corresponding abilities to manage the device on behalf of a management control center that utilizes multiple agents, which reside on respective at least one host entities independent of the management control center, to execute management functions associated with the device;
   assigning a first agent of the multiple agents in the storage area network to handle execution of a first set of management functions associated with the device;
   assigning a second agent to the multiple agents in the storage area network to handle execution of a second set of management functions associated with the device, the second set of management functions being exclusive of the first set of management functions;
   wherein receiving the information indicating performance capabilities includes receiving notification from a respective host entity on which the first agent resides indicating how fast the first agent can perform a management function with respect to the device in response to the first agent receiving a command from the management control center
   wherein assigning the first agent in the storage area network to execute a first set of management functions and assigning the second agent in the storage area network to execute a second set of management functions includes;
   identifying that the first agent resides on a respective first host entity in the storage area network;
   identifying that the second agent resides on a respective second host entity in the storage area network;
   receiving information indicating performance capabilities associated with the respective first host entity and the respective second host entity;
   assigning the first agent to execute the first set of management functions based on a performance capability of the respective first host entity on which the first agent resides; and
   assigning the second agent to execute the second set of management functions based on a performance capability of the respective second host entity on which the second agent resides.

15. A computer system associated with a storage area network, the computer system comprising:
   a processor;
   a memory unit that stores instructions associated with an application executed by the processor; and
   an interconnect coupling the processor and the memory unit, enabling the computer system to execute the application and perform operations of:
      identifying multiple agents and their corresponding abilities to manage the device on behalf of a management control center that utilizes multiple agents, which reside on respective at least one host entities independent of the management control center, to execute management functions associated with the device;
      assigning a first agent of the multiple agents in the storage area network to handle execution of a first set of management functions associated with the device; and
      assigning a second agent of the multiple agents in the storage area network to handle execution of a second set of management functions associated with the device, the second set of management functions being exclusive of the first set of management functions;
      initiating display of a list of at least one management function to a user;

from the user, receiving a selection of a particular management function to be applied to the device;

at the management control center, identifying that the particular management function falls within the first set of management functions supported by the first agent; and from the management control center, transmitting a command to the first agent to execute the particular management function on behalf of the management control center.

16. A computer system as in claim 15, wherein identifying multiple agents and their corresponding abilities to manage includes:

from the multiple agents in the storage area network, receiving information collected by the multiple agents including an indication of the corresponding abilities of the multiple agents to perform management tasks associated with the device.

17. A computer system as in claim 16 further supporting operations of:

notifying the first agent of an assignment to support the first set of management functions associated with the device; and notifying the second agent of an assignment to support the second set of management functions associated with the device.

18. A computer system as in claim 15 further supporting operations of:

providing a notification to the first agent and the second agent that they are assigned as respective primary agents for supporting different management functions associated with the device, the notification prompting the agents to run management programs to communicate with the device prior to the respective primary agents receiving user-generated commands from the management control center to perform management functions with respect to the device.

19. A computer system as in claim 15, wherein assigning the first agent in the storage area network to handle execution of the first set of management functions and assigning the second agent in the storage area network to handle execution of the second set of management functions includes:

identifying a type associated with the device; and selecting the first agent and the second agent amongst multiple agents to handle execution of the management functions in response to determining that the first agent and the second agent are particular device agents suited to support the type associated with the device.

20. A computer system as in claim 19, wherein the first agent and the second agent support a communication protocol based on at least one of:

i) SNMP (Simple Network Management Protocol),
ii) FAL (Fabric Access Layer),
iii) SMI (Storage Management Interface), and
iv) FC_SWAPI (Fibre Channel SWitch Application Programming Interface).

21. A computer system as in claim 15 further supporting operations of:

receiving information about interfaces available at each of the multiple agents, the information including an indication of corresponding protocols supported by the interfaces; and wherein assigning the first agent occurs in response to identifying that the first agent includes at least one interface for supporting communications with the device.

22. A computer system as in claim 15, wherein assigning the first agent to handle execution of the first set of management functions occurs in response to identifying that the first agent includes at least two protocol interfaces, each of which supports communications from the first agent to the device.

23. A computer system as in claim 15, wherein assigning the first agent includes:

assigning the first agent to be responsible for handling execution of the first set of management functions based on an ability of the first agent to communicate with and control the device compared to abilities of other agents to communicate with and control the device.

24. A computer system as in claim 23, wherein abilities of the first agent and the other agents to communicate with the device is based at least in part on a respective number of node hops required to communicate between a host entity on which a respective agent resides and the device.

25. A computer system as in claim 15, wherein transmitting the command to the first agent includes:

providing an indication in the command identifying which of multiple management application programming interfaces of the first agent on which to initiate execution of the command.

26. A computer system as in claim 15 further supporting operations of:

from the management control center, providing no indication in the command which of multiple management application programming interfaces of the first agent on which to initiate execution of the command but instead relying on the first agent to identify which of multiple management application programming interfaces of the first agent on which to initiate execution of the command.

27. A computer system as in claim 15 wherein the command is a generic command transmitted to the first agent, the first agent converting the generic command to vendor specific commands used to communicate with the device and execute a respective management function.

28. A computer system associated with a storage area network, the computer system comprising:

a processor;

a memory unit that stores instructions associated with an application executed by the processor; and an interconnect coupling the processor and the memory unit, enabling the computer system to execute the application and perform operations of:

identifying multiple agents and their corresponding abilities to manage the device on behalf of a management control center that utilizes multiple agents, which reside on respective at least one host entities independent of the management control center, to execute management functions associated with the device;

assigning a first agent of the multiple agents in the storage area network to handle execution of a first set of management functions associated with the device; and assigning a second agent of the multiple agents in the storage area network to handle execution of a second set of management functions associated with the device, the second set of management functions being exclusive of the first set of management functions; and wherein assigning the first agent in the storage area network to execute a first set of management functions and assigning the second agent in the storage area network to execute a second set of management functions includes;

identifying that the first agent resides on a respective first host entity in the storage area network;

identifying that the second agent resides on a respective second host entity in the storage area network;

receiving information indicating performance capabilities associated with the respective first host entity and the respective second host entity;

assigning the first agent to execute the first set of management functions based on a performance capability of the respective first host entity on which the first agent resides; and assigning the second agent to execute the second set of management functions based on a performance capability of the respective second host entity on which the second agent resides wherein receiving the information indicating performance capabilities includes receiving notification from a respective host entity on which the first agent resides indicating how fast the first agent can perform a management function with respect to the device in response to the first agent receiving a command from the management control center.

29. A computer program product including a computer-storage medium having instructions stored thereon for processing data information, such that the instructions, when carried out by a processing device, enable the processing device to perform the steps of:

identifying multiple agents and their corresponding abilities to manage the device on behalf of a management control center that utilizes multiple agents, which reside on respective at least one host entities independent of the management control center, to execute management functions associated with the device;

assigning a first agent of the multiple agents in the storage area network to handle execution of a first set of management functions associated with the device;

assigning a second agent of the multiple agents in the storage area network to handle execution of a second set of management functions associated with the device, the second set of management functions being exclusive of the first set of management functions;

initiating display of a list of at least one management function to a user;

from the user, receiving a selection of a particular management function to be applied to the device;

at the management control center, identifying that the particular management function falls within the first set of management functions supported by the first agent; and from the management control center, transmitting a command to the first agent to execute the particular management function on behalf of the management control center.

* * * * *